United States Patent
Chang (10) Patent No.: US 9,048,673 B2
(45) Date of Patent: Jun. 2, 2015

(54) CONNECTOR WITH EMBEDDED CHARGING INTEGRATED CIRCUITS

(71) Applicant: Nai-Chien Chang, New Taipei (TW)

(72) Inventor: Nai-Chien Chang, New Taipei (TW)

(*) Notice: Subject to any disclaimer, the term of this patent is extended or adjusted under 35 U.S.C. 154(b) by 278 days.

(21) Appl. No.: 13/729,608

(22) Filed: Dec. 28, 2012

(65) Prior Publication Data

US 2013/0175979 A1 Jul. 11, 2013

(30) Foreign Application Priority Data

Jan. 9, 2012 (TW) .............................. 101200482 U (51) Int. Cl.
| | |
|---|---|
| *H02J 7/00* | (2006.01) |
| *H01R 13/66* | (2006.01) |
| *H01R 12/72* | (2011.01) |
| *H01R 24/62* | (2011.01) |

(52) U.S. Cl.
CPC .......... *H02J 7/0042* (2013.01); *H01R 13/6675* (2013.01); *H01R 12/724* (2013.01); *H01R 24/62* (2013.01)

(58) Field of Classification Search
CPC . H02J 7/0042; H01R 12/724; H01R 13/6675; H01R 24/62; H01R 13/5045; H01R 13/65802; H01R 23/7073

See application file for complete search history.

(56) References Cited

U.S. PATENT DOCUMENTS

| | | | | |
|---|---|---|---|---|
| 6,964,582 | B2 * | 11/2005 | Zhuang et al. | 439/607.03 |
| 7,604,512 | B1 * | 10/2009 | Chen | 439/660 |
| 7,727,019 | B2 * | 6/2010 | Droesbeke et al. | 439/607.35 |
| 7,927,145 | B1 * | 4/2011 | Chang | 439/607.31 |
| 2007/0182363 | A1 * | 8/2007 | Yang | 320/107 |

* cited by examiner

*Primary Examiner* — Nha Nguyen
(74) *Attorney, Agent, or Firm* — Muncy, Geissler, Olds & Lowe, P.C.

(57) ABSTRACT

A connector with embedded charging integrated circuits mainly has an insulating housing, an insulating base, a plurality of connecting terminals, a PCB, a charging IC, and a plurality of forwarding terminals. A tongue portion extends outward from one side of the insulating housing, a plurality of terminal slots are disposed in the tongue portion. The connecting terminals, the forwarding terminals and the charging IC electrically connect with the PCB. The insulating base is to carry the PCB, and the connecting terminals are accommodated in the terminal slots while the insulating base assembles with the insulating housing. While the connector receives electrical energy provided by the motherboard of an external device, the charging current provided by the motherboard is transmitted to the charging IC through the forwarding terminals, the charging current processed and improved by the charging IC is output via the connecting terminals to speed up the charging.

11 Claims, 6 Drawing Sheets

CONNECTOR WITH EMBEDDED CHARGING INTEGRATED CIRCUITS

This application is based on and claims the benefit of Taiwan Application No. 101200482 filed Jan. 9, 2012 the entire disclosure of which is incorporated by reference herein.

BACKGROUND OF THE INVENTION

1. Field of the Invention

The present invention is related to a connector, more particularly to a connector that embeds charging ICs.

2. Description of Related Art

With the development of semi-conductor, variable electronic devices are coming out. Nowadays, the most popular products are portable electronic devices, such as smartphone, pad computer, digital camera, MP3 player, portable hard disk, etc.

As aforesaid, due to the smaller volume of a portable electronic device, the battery capacity is also restricted. With the popularity of the USB connector, almost all kinds of portable electronic devices are configured on the USB port. Such that, users can directly charge the portable electronic devices through USB interfaces, and it is very convenient. More, although some devices may not equip with USB ports, such as Apple™ products, the devices can connect with the USB ports of computers through transmission lines. Thus, computers are able to output charging current via USB ports thereof, and then provide the charging current to the electronic devices without USB ports via transmission lines.

According to rules of specifications, the standard specifications of USB connector are 5 V of output voltage, 0.5 A of output current, and 2.5 W of output power. Hence, for some electronic devices with larger battery capacities, the charging time is obviously longer, and that is inconvenient to users. For instance, the battery capacity of iPad is 24.8 Wh, therefore the power of a standard USB port is too small, and Apple may not allow that users charge iPads by means of USB ports of computers.

Presently a charging IC is appeared in the market and mainly disposed on the motherboard of a computer. The charging IC may process charging current first and then improve the charging current while the motherboard outputs the charging current through the USB port thereon. Therefore, when the USB port charges the portable electronic device connecting with the USB port, the output power shall be increased. Thus, not only the charging time is shorter, but the output power is raised up also. So that the electronic device being not charged due to smaller output power, such as iPad, will be charged through the USB port without any problem.

The charging IC truly occupies the space on the motherboard, and if the motherboard is equipped on a laptop motherboard or a barebone motherboard, the space may be occupied more. As aforesaid, for saving space, a motherboard with charging IC is rare.

Accordingly, how to improve the charging current via the charging IC and the charging IC not occupying the space on the motherboard are two important issues that the inventor focuses on.

SUMMARY OF THE INVENTION

The main objective of the present invention is to provide a connector with embedded charging integrated circuits. Through the charging IC in the connector, the amount of charging current provided by an electronic device can be modified in order to increase the output power from the electronic device via the connector.

To achieve aforesaid objective, the present invention mainly has an insulating housing, an insulating base, a plurality of connecting terminals, a PCB, a charging IC, and a plurality of forwarding terminals. A tongue portion extends outward from one side of the insulating housing, a plurality of terminal slots are disposed in the tongue portion. The plurality of connecting terminals, the plurality of forwarding terminals and the charging IC electrically connect with the PCB. The insulating base is to carry the PCB, and the connecting terminals are accommodated in the terminal slots while the insulating base assembles with the insulating housing.

Compared to related arts, the present invention is able to control and increase the output power of an electronic device via the charging IC. Therefore, device with higher specifications can be supported, and the time of charging is shorter as well. Further, the charging IC is directly disposed inside the connector but not on the motherboard of the electronic device so as to decrease occupied spaces of the motherboard.

DETAILED DESCRIPTION OF THE INVENTION

The foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

Figure 1:
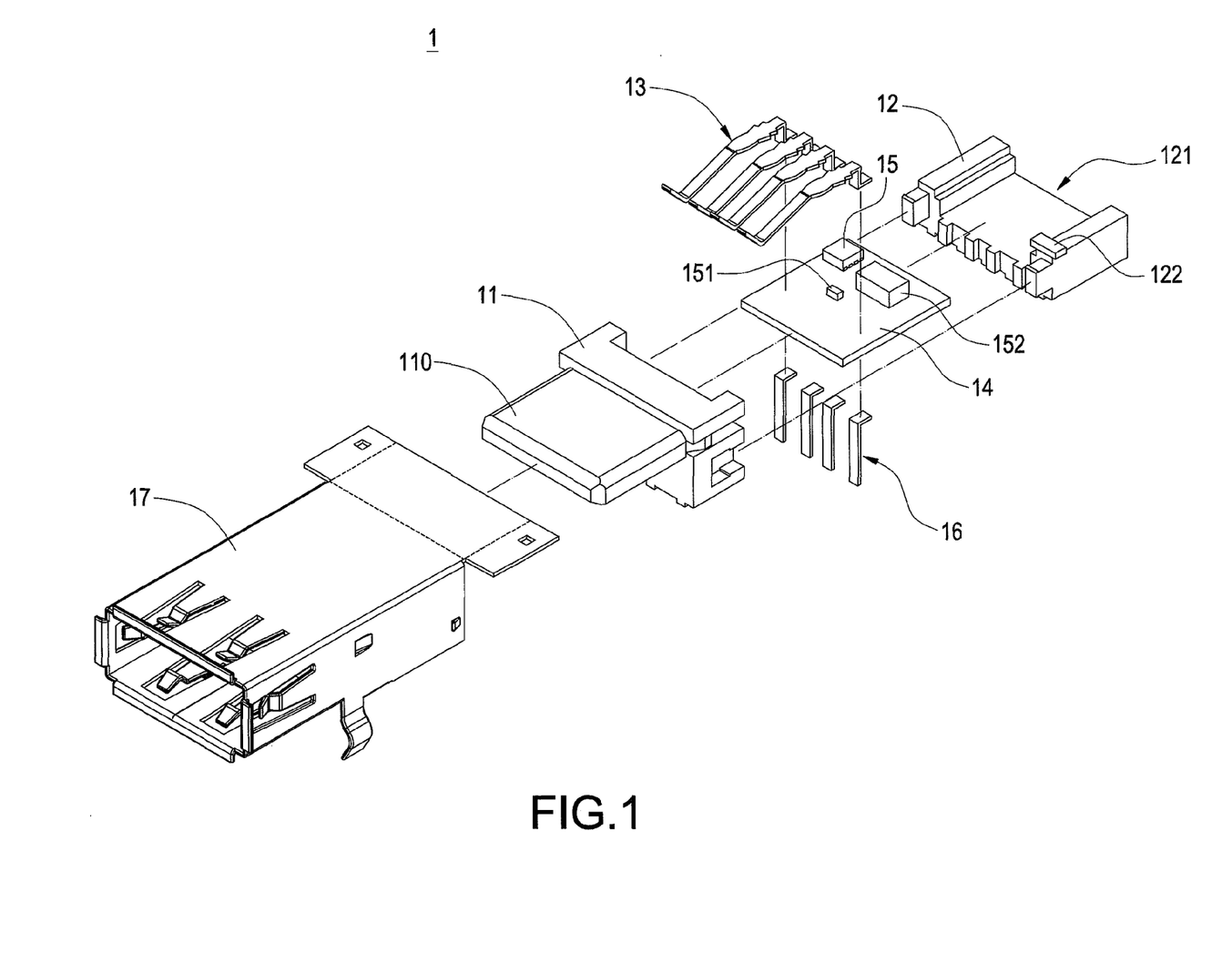
FIG. 1 illustrates a schematic exploded view of a preferred embodiment of the connector of the present invention.

Please refer to FIG. 1, which illustrates a schematic exploded view of a preferred embodiment of the connector of the present invention. The present invention provides a connector 1 with embedded charging integrated circuits, and the connector 1 is able to support a connector interface that is to output electrical energy, such as connector with USB 2.0 or 3.0, but is not limited.

Figure 3:
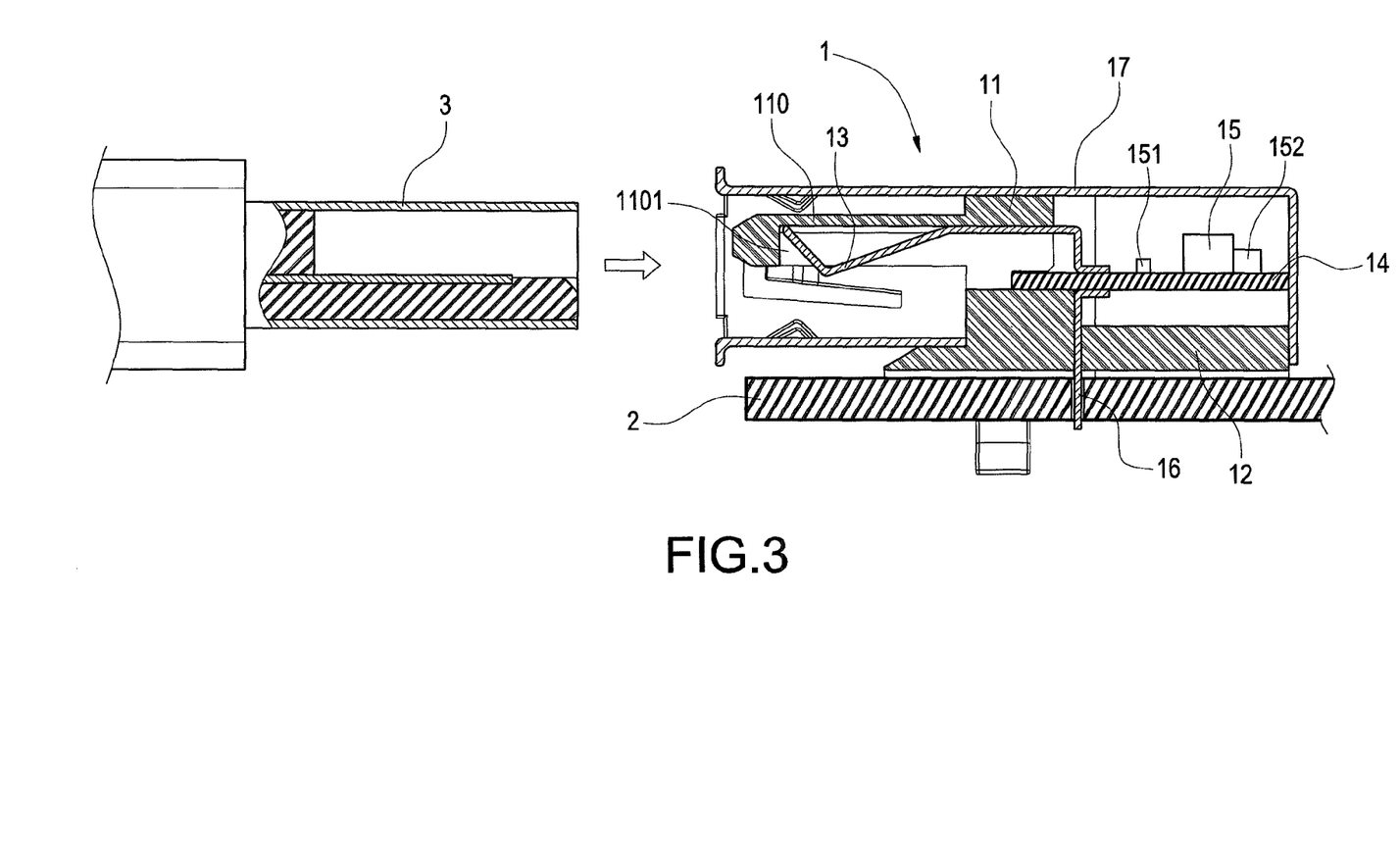
FIG. 3 illustrates a schematic sectional view of the preferred embodiment of the connector of the present invention.

While a motherboard, as a motherboard 2 shown in FIG. 3, of an electronic device disposes the connector 1, the electronic device is able to connect with, by direct connection or transmission line, an external device through the connector 1. The motherboard 2 provides charging current, and the charging current outputs to the external device after the connector 1 processes the charging current, thereafter the external device is charged.

For the preferred embodiment, the connector 1 mainly has an insulating housing 11, an insulating base 12, a plurality of connecting terminals 13, a PCB 14, a charging IC 15, and a plurality of forwarding terminals 16. A tongue portion 110 extends outward from one side of the insulating housing 11, and a plurality of terminal slots are disposed in the tongue portion 1101, as shown in FIG. 3. A bearing portion 121 is disposed on the insulating base 12 for carrying the PCB 14, the insulating base 12 connects with a side that is away from the side with the tongue portion 110.

Figure 2:
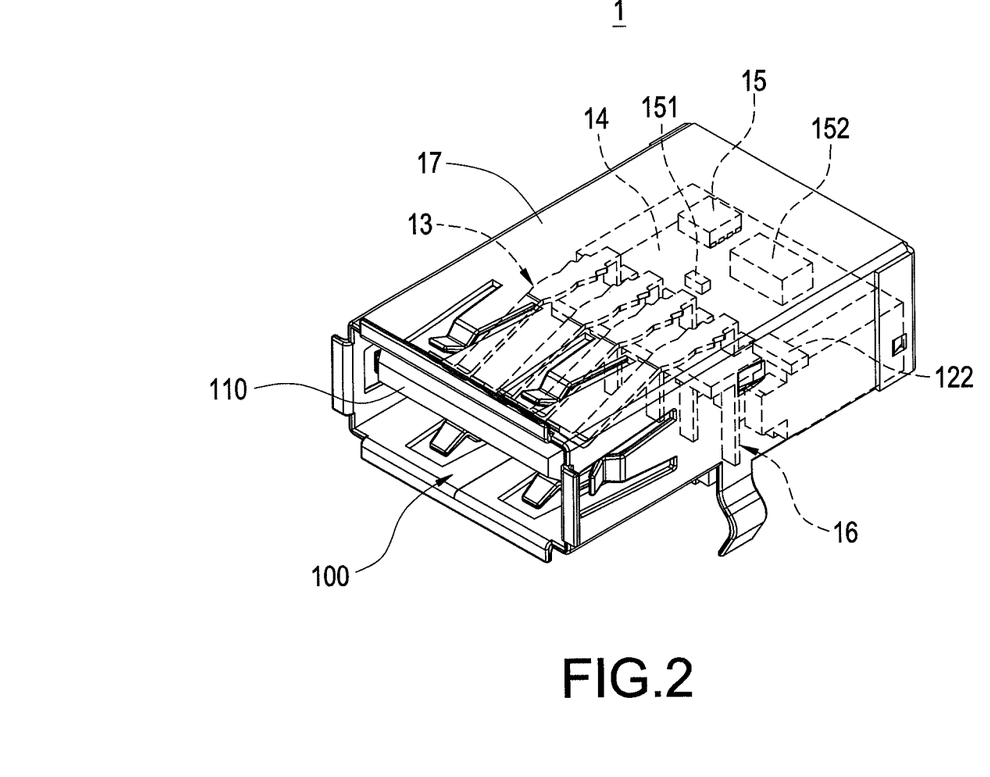
FIG. 2 illustrates a schematic 3-D assembled view of the preferred embodiment of the connector of the present invention.

One end of each of the connecting terminals 13 electrically connects with the PCB 14, another end extends to each terminal slot 1101 in the tongue portion 110, the plurality of connecting terminals 13 extend out the tongue portion 110 for external connection and form a connecting port 100 of the connector 1 with the tongue portion 110, as shown in FIG. 2. For the preferred embodiment, the amount of the connecting terminals 13 is four, and the connecting terminals 13 and the insulating housing 11 form the connecting port 100 with USB.

The charging IC 15 electrically connects with the PCB 14 and then the plurality of connecting terminals 13. The charging IC 15 mainly adjusts charging current provided by the motherboard 2 and outputs the charging current via the connecting terminals 13.

One end of each of the forwarding terminals 16 electrically connects with the PCB 14 and then the charging IC 15, another end extends toward a side that is away from the PCB 14 and out the bottom of the connector 1, the connector 1 electrically connects with the motherboard 2 through the plurality of forwarding terminals 16.

As shown in figure, the connector 1 further has a metal casing 17 in order to cover the insulating housing 11, the insulating base 12, the plurality of connecting terminals 13, the PCB 14, the charging IC 15, and the plurality of forwarding terminals 16 for improving the effect of metal shield. By means of the metal casing 17, the connector 1 improves the effect of metal shield for decreasing noise interference. An opening is disposed on the front end surface of the metal casing 17, and the connecting port 100 passes through the opening to be out the connector 1 for external connection.

It is to be noted that the insulating base 12 further has a metal conduction portion 122 thereon, the metal conduction portion 122 connects with the metal casing 17 and the grounding legs of the plurality of connecting terminals 13 simultaneously. More practically, the grounding legs of the plurality of connecting terminals 13 may not connect with the PCB 14, but electrically connects with the metal casing 17 via the metal conduction portion 122, thus the connector 1 is directly through the metal casing 17 for providing the effect of grounding.

Please refer to FIG. 2 and FIG. 3, which illustrate a schematic 3-D assembled view of a preferred embodiment of the connector of the present invention and a schematic sectional view of the preferred embodiment of the connector of the present invention. As shown in figures, the connector 1 electrically connects with the PCB 2 by means of the forwarding terminals 16, and connects with an external male connector 3 via the connecting port 100 assembled by the tongue portion 110 and the connecting terminals 13. For the preferred embodiment, the connecting port 100 is a female USB connector, and the male connector 3 is a male USB connector, but both are not limited. While the male connector 3 inserts into the connecting port 100 of the connector 1 and the inner terminals of the male connector 3 electrically conduct to the connecting terminals 13, the male connector 3 receives the digital information from the PCB 2 through the connector 1, and receives the electrical energy output by the PCB 2 via the connector 1.

For the preferred embodiment, while the PCB 2 detects the connection of the male connector 3 and the connector 1, the PCB 2 provides charging current to the connector 1, the charging current is transmitted to the charging IC 15 via the plural forwarding terminals 16 and is processed by the charging IC 15. The charging IC 15 mainly increases the amount of the charging current and controls the voltage in order to protect an electronic device, not shown in figure, connecting with another end of the male connector 3. At last, the processed charging current may be through the connecting terminals 13 to output to the male connector 3. By means of the male connector 3, the charging current is transmitted to the electronic device connecting with the other end of the male connector 3 for charging.

For the preferred embodiment, the amount of the terminals of the input end of the connector 1 is the same as the amount of the terminals of the output end of the connector 1. That is, the amount of the connecting terminals 13 is equal to the amount of the forwarding terminals 16. More practically, the amount of the connecting terminals 13 of the connector 1 is four, and the amount of the forwarding terminals 16 is four as well.

Figure 4:
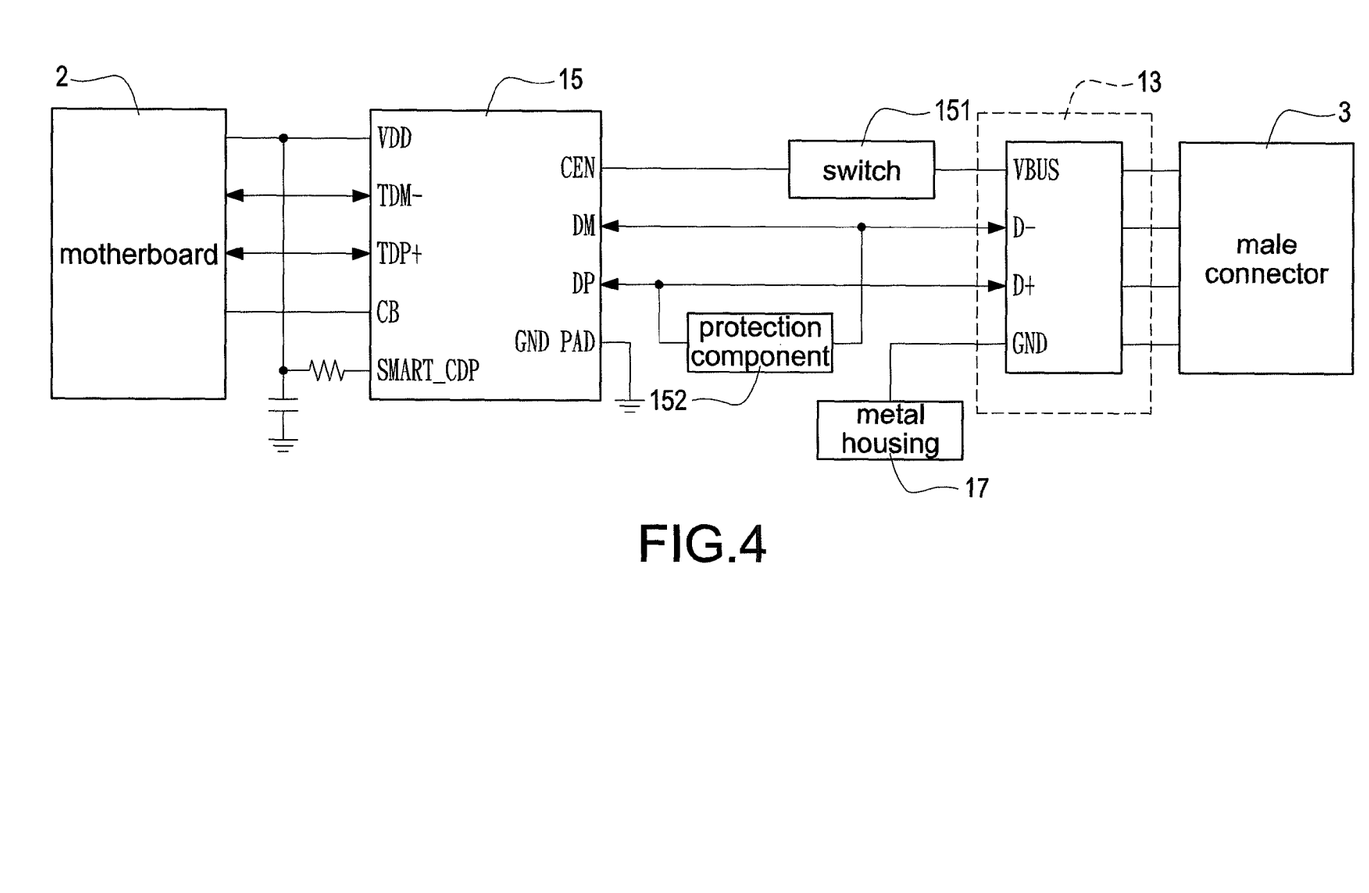
FIG. 4 illustrates a schematic view of circuits of the preferred embodiment of the present invention.

Please refer to FIG. 4, which illustrates a schematic view of circuits of a preferred embodiment of the present invention. As shown in figure, the charging IC 15 mainly has eight sets of pins and a grounding pad (GND PAD). More practically, the type of the charging IC is a chip IC with the model number of SLG5583 or SLG5583A, but is not restricted. Three sets of pins of the charging IC 15 electrically connect with the connecting terminals 13. For the other five sets of pins, two sets of pins are connected to each other through a resistor. Therefore, there are four sets of pins electrically connecting with the forwarding terminals 16. Three of the plural connecting terminals 13 electrically connect with three sets of pins of the charging IC 15, the last connecting terminal 13 is grounding pin and electrically connects with the metal casing 17 through the metal conduction portion 122.

As shown in figure, the three sets of pins of the charging IC 15 electrically connecting with the connecting terminals 13 mainly has a current limit switch (CEN) pin, a minus data input (DM) pin, and a plus data input (DP) pin, wherein the CEN pin connects with a VBUS pin in USB specifications, the DP pin and DM pin connect with a D+ pin and D− pin in USB specifications.

The five sets of pins of the charging IC 15 connecting with the forwarding terminals 16 mainly has a switch control bit (CB) pin, a power supply (VDD) pin, an input control logic (SMART-CDP) pin, a minus USB host transceiver (TDM−) pin, and a plus USB host transceiver (TDP+) pin. The VDD pin and the SMART-CDP pin are connected to each other in series via a resistor and connect with the PCB 2 through one forwarding terminals 16. The VDD pin and SMART-CDP pin receive the charging current from the PCB 2, and the charging IC 15 refers to the states of other pins to determine how the received charging current is processed. The TDM− pin and TDP+ pin are used to transmit digital data between the connector 1 and the motherboard 2, but nothing related to the charging current.

It is to be noted that the CB connects with the hardware use pin of the PCB 2. Through the hardware use pin, the PCB 2 determines that the connector 1 is a regular USB connector or the connector with embedded charging integrated circuits provided by the present invention. Therefore, no matter what a regular USB connector or the connector 1 provided by the present invention, the PCB 2 can accurately determine a correct result and cooperate with one of them. More practically, the connector 1 of the present invention still connects with the PCB 2 through the four forwarding terminals 16. The four forwarding terminals 16 may not have a grounding pin, but the forwarding terminals connecting with the hardware use pin of the PCB 2.

As aforesaid, the connector 1 of the present invention may not electrically connect with the Ground of the PCB 2. Therefore, for safety to the connector 1, the present invention mainly adds two technical features: (1) one of the connecting terminals 13 directly connects with the metal casing 17 of the connector 1 for grounding; and (2) one or more protection components are disposed in between the DP pin and DM pin.

As shown in FIG. 4, the protection component 152 is an example and is mainly a Gas Discharge Tube (GDT), Transient Voltage Suppressor (TVS), etc., but not limited. Therefore, although the connector 1 may not connect with the Ground of the PCB 2, the safety of the connector 1 may be promoted according to above two technical features.

Further, the GEN pin of the charging IC 15 electrically connects with the VBUS pin of the connecting terminals 13 through a switch 151. Thus, while the charging IC 15 outputs the charging current, signals from the charging IC 15 are transmitted to the switch 151 simultaneously for raising the safety to the connector 1. For instance, the charging IC 15 continuously detects the charging status of the electronic device connecting with the other end of the male connector 3. The electronic device may send a signal to the switch 15 at the end of charging so as to turn off the switch 15. Thus, the electronic device may not be charged for preventing damage. However, aforesaid is only a preferred embodiment of the present invention, but not limited.

Figure 5:
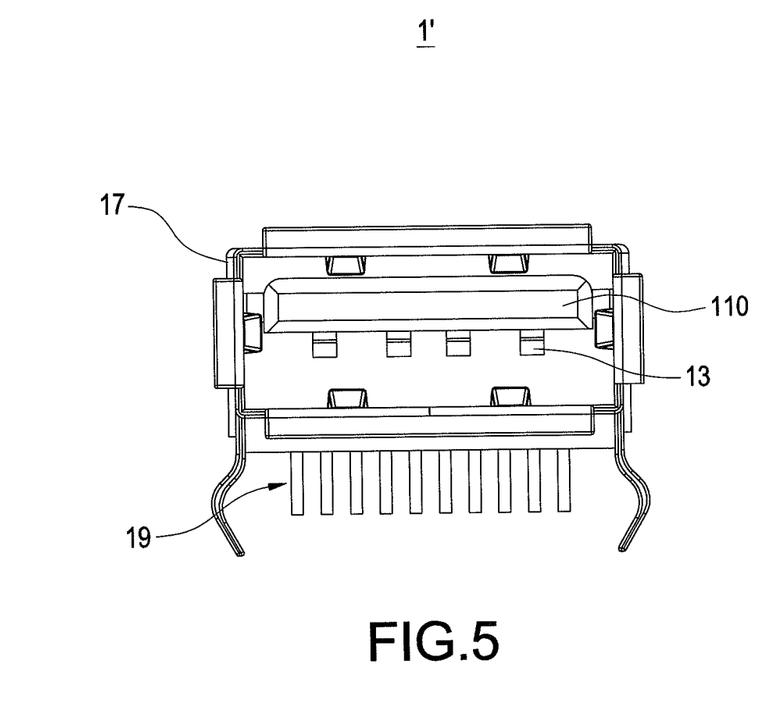
FIG. 5 illustrates a schematic front view of the connector of another preferred embodiment of the present invention.
Figure 6:
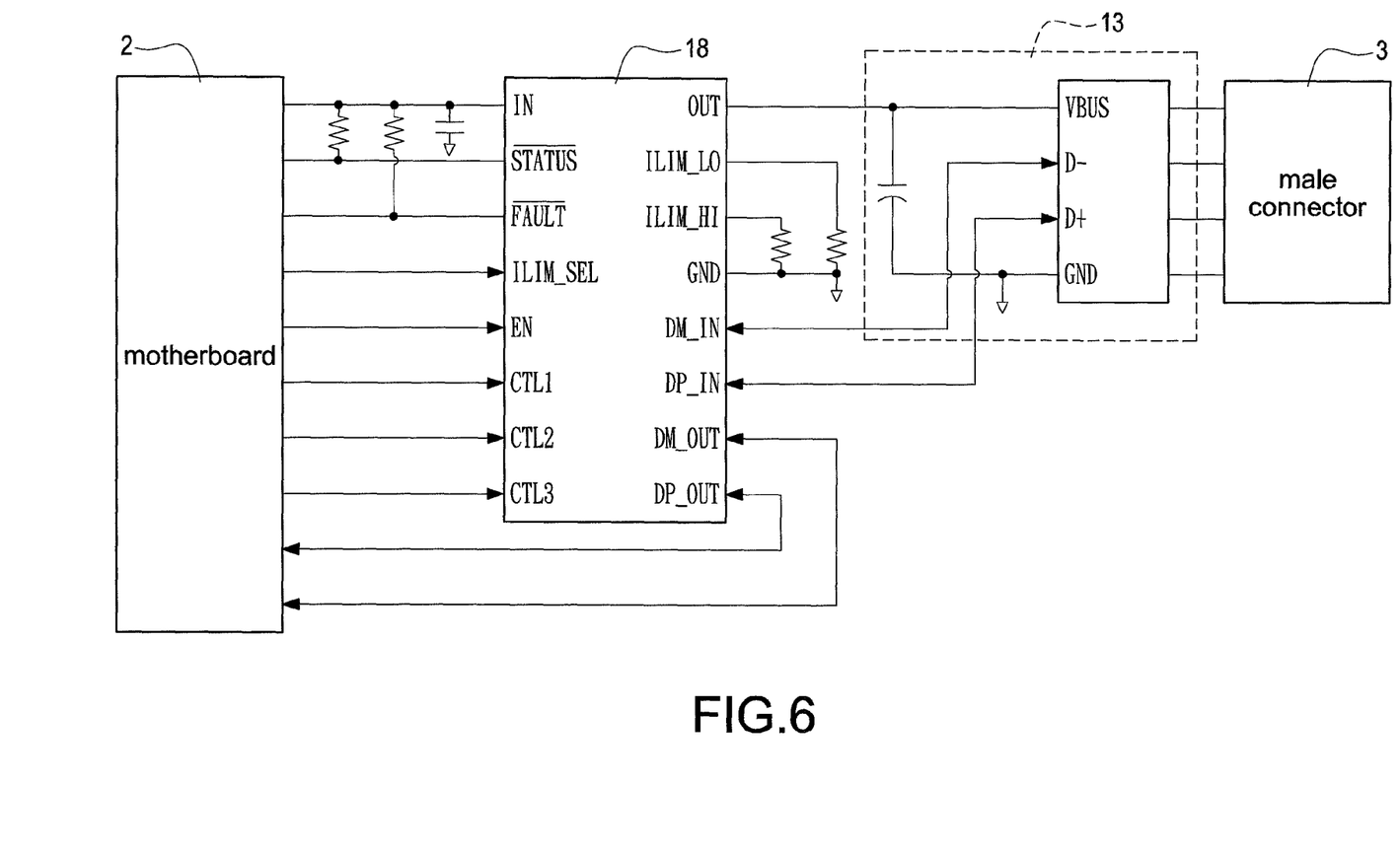
FIG. 6 illustrates a schematic view of circuits of the connector of the preferred embodiment of the present invention.

Please refer to FIG. 5 and FIG. 6, which illustrate a schematic front view of the connector of another preferred embodiment of the present invention and a schematic view of circuits of the connector of the preferred embodiment of the present invention. As shown in FIG. 5, the preferred embodiment discloses another connector 1' that has the insulating housing 11, the insulating base 12, the plurality of connecting terminals 13, and the PCB 14, aforesaid components are the same as the connector's 1. The connector 1' has a charging IC 18 and a plurality of forwarding terminals 19 that are different from aforesaid preferred embodiment.

For the preferred embodiment, the amount of the terminals of the output end of the connector 1' is not the same as the amount of the terminals of the input end of the connector 1'. That is, the amount of the connecting terminals 13 is not equal to the amount of the forwarding terminals 19. More practically, the amount of the connecting terminals 13 of the connector 1' is at least four, and the amount of the forwarding terminals 19 is at least ten, but not restricted.

The motherboard 2, as shown in FIG. 3, provides output charging current, and the output charging current is transmitted to the connector 1' via the forwarding terminals 19, thus the charging IC 18 in the connector 1' processes the output charging current. The charging IC 18 increases the amount of the charging current in order to control generated voltage that is not too high. At last, the processed charging current may be through the connecting terminals 13 to output to the male connector 3, as shown in FIG. 3. By means of the male connector 3, the charging current is transmitted to the electronic device connecting with the other end of the male connector 3 for charging. Through the electrical connection of the male connector 3 and the connector 1', the electronic device and the motherboard 2 transmit digital data to each other via the connecting terminals 13 and the forwarding terminals 19.

As shown in FIG. 6, the charging IC 18 mainly has sixteen sets of pins, more practically, the charging IC 18 is a chip IC with the model number of TPS2543 or TPS2544, but not limited. Four sets of pins of the charging IC electrically connect with the connecting terminals 13, and ten sets of pins electrically connect with the forwarding terminals 19, but two more sets of pins are in ground connection via a resistance.

The four sets of pins connecting with the charging IC 18 and the connecting terminals 13 mainly has a power output (OUT) pin, a plus data input (DP_IN) pin, a minus data input (DM_IN), and a ground (GND) pin, wherein the OUT pin connects with a USB VBUS pin, the DP_IN pin and DM_IN pin connect with a D+ pin and a D− pin, and the USB GND and the grounding pins of the charging IC 18 are in ground connection simultaneously. It is to be noted, for the preferred embodiment, the grounding pins of the connecting terminals 13 electrically connect with the metal casing 17 through the metal conduction portion 122 of the insulating base 12 for grounding, but not limited.

The ten sets of pins of the charging IC 18 connecting with the forwarding terminals 19 mainly has a power input (IN) pin, a status (STATUS) pin, a detection signal (FAULT) pin, an enable (EN) pin, four control signal (ILIM_SEL, CTL1, CTL2, CTL3) pins, and two data output (DM_OUT, DP_OUT) pins. The IN pin receives the charging current from the PCB 2, and the charging IC 18 refers to the status of other pins to determine how the received charging current is processed. The DM_OUT pin and DP_OUT pin are used to transmit digital data between the connector 1' and the motherboard 2, but nothing related to the charging current.

By means of the connectors 1 and 1' of the present invention, the charging ICs 15 and 18 is capable of increasing the output charging current in order to speed up that the connectors 1 and 1' charge the two external devices. Further, while the output power of the connectors 1 and 1' is increased, an electronic device needing higher voltage and not charged by traditional USB connector, such as iPad™, can be supported. More important, the charging ICs 15 and 18 are directly disposed in the connectors 1 and 1' respectively, but not on the motherboard 2. That is, the precious space on the motherboard 2 can be saved effectively, and the saved space reserves for chip with higher specifications, or the volume of the motherboard 2 can be smaller so as to facilitate the development and production of motherboard.

Although specific embodiments of the present invention have been described for illustrative purposes, those skilled in the art will appreciate that various modifications, additions and substitutions are possible, without departing from the scope and the spirit of the invention as disclosed in the accompanying claims.

What is claimed is:

1. A connector with embedded charging integrated circuits for electrically connecting with a motherboard of an external device in order to receive power provided by the motherboard and comprising:

an insulating housing, a tongue portion extending outward from one side thereof, a plurality of terminal slots being disposed in the tongue portion;

an insulating base, a bearing portion being disposed thereon, the insulating base connecting with a side that is away from the side with the tongue portion;

a printed circuit board (PCB), disposed on the bearing portion of the insulating base:

a plurality of connecting terminals, one end of each of the connecting terminals electrically connecting with the PCB, another end extending to each terminal slot in the tongue portion, the plurality of connecting terminals extending out the tongue portion and forming a connecting port with the tongue portion in order to connect with an external male connector;

a charging integrated circuit (IC), electrically connecting with the PCB and then the plurality of connecting terminals;

a plurality of forwarding terminals, one end of each of the forwarding terminals electrically connecting with the PCB and then the charging IC, another end extending toward a side that is away from the PCB and out the bottom of the connector, the connector electrically connecting with the motherboard through the plurality of forwarding terminals; and a metal casing in order to cover the insulating housing, the insulating base, the plurality of connecting terminals, the PCB, the charging IC, and the plurality of forwarding terminals for improving the effect of metal shield, wherein the charging current provided by the motherboard is transferred to the charging IC by the plurality of forwarding terminals, the charging IC processing the charging current for increasing the amount of current, the current being output via the plurality of connecting terminals.

2. The connector with embedded charging integrated circuits according to claim 1, wherein the insulating base has a metal conduction portion thereon, the metal conduction portion connecting with the metal casing and the grounding legs of the plurality of connecting terminals simultaneously, thus the connector is directly through the metal casing for providing the effect of grounding.

3. The connector with embedded charging integrated circuits according to claim 2, wherein the amount of the plurality of connecting terminals is four, the connecting terminals and the tongue portion forming a USB connecting port, the amount of the forwarding terminals being four, the charging IC having eight sets of pins, three sets of pins electrically connecting with the connecting terminals, another five sets of pins electrically connecting with the forwarding terminals.

4. The connector with embedded charging integrated circuits according to claim 3, wherein the three sets of pins, connecting with the connecting terminals, on the charging IC comprises a current limit switch pin, a minus data input pin, and a plus data input pin, the other five sets of pins, connecting with the forwarding terminals, on the charging IC comprising a switch control bit pin, a power supply pin, an input control logic pin, a minus USB host transceiver pin, and a plus USB host transceiver, wherein the power supply pin and input control logic pin are in series connection through a resistance and electrically connect with the same forwarding terminal.

5. The connector with embedded charging integrated circuits according to claim 4, wherein at least one protection component is disposed in between the DM and DP.

6. The connector with embedded charging integrated circuits according to claim 5, wherein the protection component is gas discharge tube (GDT) or transient voltage suppressor (TVS).

7. The connector with embedded charging integrated circuits according to claim 4, wherein the DM and DP on the charging IC electrically connect with the signal pins of the connecting terminals through a switch.

8. The connector with embedded charging integrated circuits according to claim 4, wherein the type of the charging IC is a chip IC with the model number of SLG5583 or SLG5583A.

9. The connector with embedded charging integrated circuits according to claim 1, wherein the amount of the plurality of connecting terminals is four, the connecting terminals and the tongue portion forming a USB connecting port, the amount of the forwarding terminals being ten, the charging IC having sixteen sets of pins, four sets of pins electrically connecting with the connecting terminals, another ten sets of pins electrically connecting with the forwarding terminals, two more sets of pins grounding.

10. The connector with embedded charging integrated circuits according to claim 9, wherein the four sets of pins, connecting with the connecting terminals, on the charging IC comprises a power output pin, two data input pins, and a ground pin, the other ten sets of pins, connecting with the forwarding terminals, on the charging IC comprising a power input pin, a status pin, a detection signal pin, an enable pin, four control signal pins, and two data output pins.

11. The connector with embedded charging integrated circuits according to claim 10, wherein the charging IC is a chip IC with the model number of TPS2543 or TPS2544.

* * * * *